US009023981B2

(12) United States Patent
Krishnan et al.

(10) Patent No.: US 9,023,981 B2
(45) Date of Patent: May 5, 2015

(54) METHOD FOR ODOR REDUCTION OF NON-AQUEOUS DISPERSIONS

(75) Inventors: Ramasamy Krishnan, North Brunswick, NJ (US); Mark Schneider, Dumont, NJ (US); David Klein, Wayne, NJ (US)

(73) Assignee: Sun Chemical Corporation, Parsippany, NJ (US)

( * ) Notice: Subject to any disclaimer, the term of this patent is extended or adjusted under 35 U.S.C. 154(b) by 205 days.

(21) Appl. No.: 13/387,432

(22) PCT Filed: Jul. 30, 2010

(86) PCT No.: PCT/US2010/043999
§ 371 (c)(1),
(2), (4) Date: Jan. 27, 2012

(87) PCT Pub. No.: WO2011/014826
PCT Pub. Date: Feb. 3, 2011

(65) Prior Publication Data
US 2012/0123030 A1 May 17, 2012

Related U.S. Application Data

(60) Provisional application No. 61/229,908, filed on Jul. 30, 2009.

(51) Int. Cl.
| | |
|---|---|
| *C08F 6/02* | (2006.01) |
| *C08F 6/24* | (2006.01) |
| *C08K 3/12* | (2006.01) |
| *C08K 3/38* | (2006.01) |
| *C08F 6/00* | (2006.01) |
| *C08F 6/22* | (2006.01) |
| *C09D 7/12* | (2006.01) |
| *C08K 3/22* | (2006.01) |
| *C08K 5/17* | (2006.01) |

(52) U.S. Cl.
CPC . *C08F 6/006* (2013.01); *C08F 6/24* (2013.01); *C08F 6/22* (2013.01); *C09D 7/1208* (2013.01); *C08K 3/22* (2013.01); *C08K 5/17* (2013.01); *Y10S 524/923* (2013.01)

(58) Field of Classification Search
USPC .......................... 528/489, 492; 524/251, 923
See application file for complete search history.

(56) References Cited

U.S. PATENT DOCUMENTS

| | | | |
|---|---|---|---|
| 3,847,851 A | 11/1974 | Tugukuni et al. | |
| 4,021,400 A * | 5/1977 | McKenna | 523/102 |
| 4,146,590 A * | 3/1979 | Yamamoto et al. | 525/168 |
| 4,251,412 A | 2/1981 | Ferrini | |
| 4,253,397 A | 3/1981 | Emmons et al. | |
| 4,278,582 A | 7/1981 | Miller | |
| 4,632,961 A * | 12/1986 | Tsutsui et al. | 525/162 |
| 5,093,390 A * | 3/1992 | Shibato et al. | 523/339 |
| 5,547,804 A | 8/1996 | Nishizawa et al. | |
| 5,698,616 A | 12/1997 | Baker et al. | |
| 2002/0058730 A1 | 5/2002 | Kawashima et al. | |
| 2003/0078319 A1 | 4/2003 | Sprycha et al. | |
| 2005/0085559 A1 | 4/2005 | Hahnle et al. | |
| 2005/0244736 A1 | 11/2005 | Yon et al. | |
| 2007/0173560 A1* | 7/2007 | Uozumi | 523/160 |
| 2010/0136236 A1 | 6/2010 | Hosoya et al. | |

FOREIGN PATENT DOCUMENTS

| | | |
|---|---|---|
| CN | 101007917 | 8/2007 |
| DE | 19511476 | 11/1995 |
| EP | 1764161 A1 | 3/2007 |
| EP | 2053069 | 4/2009 |
| GB | 2434371 | 7/2007 |
| JP | S49-020252 | 2/1974 |
| JP | 03-106970 | 5/1991 |
| JP | 06-073261 | 3/1994 |
| JP | 07-268264 | 10/1995 |
| JP | 07319221 | 12/1995 |
| JP | 2000-273381 | 10/2000 |
| JP | 2006-299039 | 11/2006 |
| JP | 2006-348189 | 12/2006 |
| JP | 2007-197500 | 8/2007 |
| WO | 03044105 A1 | 5/2003 |
| WO | 2007068102 | 6/2007 |
| WO | 2009155201 A1 | 12/2009 |
| WO | 2011014826 A1 | 2/2011 |

OTHER PUBLICATIONS

Office Action issued in connection with European Application No. 09767511.0 dated Dec. 17, 2013.
Database WPI Week 200747, Thomson Scientific, Longon, GB; AN 2007-478347, XP002540852 & JP 2006 348189 A (Dynic Corp.) Dec. 28, 2006, Abstract.
Office Action issued in connection with European Application No. 10805141.8 dated Nov. 27, 2012.
Office Action issued in connection with Japanese Application No. 2012-523107 dated Dec. 24, 2013 (with English translation).
International Search Report issued in connection with PCT/US2011/060845, dated Mar. 8, 2012.

* cited by examiner

*Primary Examiner* — Tae H Yoon
(74) *Attorney, Agent, or Firm* — Charles C. Achkar; Ostrolenk Faber LLP

(57) ABSTRACT

The use of non aqueous dispersions NADs has enabled the development of fast setting sheet fed inks, for example. However either due to residual monomers or fractions of initiators, these NAD's have an objectionable odor. A chemical means of dramatically reducing the odor of the NAD's is thus presented. In exemplary embodiments of the present invention, such a chemical treatment can include an amine/alkali mixture in a coupling solvent. In exemplary embodiments of the present invention, the coupling solvent can be one or more of an alcohol, glycol or glycol ether, such as, for example, isopropyl alcohol. In exemplary embodiments of the present invention the amine can be an alkyl amine, such as, for example, diethyl amine, or various other amines, whether alone or in combination. In exemplary embodiments of the present invention, the alkali can be one or more of sodium hydroxide, potassium hydroxide and ammonium hydroxide, whether alone or in any combination thereof.

17 Claims, No Drawings

METHOD FOR ODOR REDUCTION OF NON-AQUEOUS DISPERSIONS

CROSS-REFERENCE TO RELATED APPLICATIONS

This application is a 35 U.S.C. §371 National Stage Entry of International Application No. PCT/US2010/043999, filed on Jul. 30, 2010, which claims priority to U.S. Provisional Application No. 61/229,908, filed on Jul. 30, 2009, both of which are hereby incorporated by reference in their entirety for all purposes as if fully set forth herein.

TECHNICAL FIELD

The present invention relates to ink and related technologies, and in particular to a method for the reduction of odors in non-aqueous dispersions.

BACKGROUND OF THE INVENTION

The use of non-aqueous dispersions (NADs) has enabled the development of fast setting sheet fed inks. However, due to either residual monomers or fractions of initiators, these NADs often have an objectionable odor.

As is known, a residual monomer is an un-polymerized monomer that remains incorporated in a polymer after the polymerization reaction has completed. Many residual monomers are malodorous, and some are even toxic. For example, acrylic acid and methacrylic acid, as well as peroxides used as initiators, have objectionable odors.

Aqueous emulsion polymerization systems are well known for the production of many types of polymers, including, for example, rubbery styrene-butadiene polymers as well as polymers containing acrylonitrile ("ACN"). In commercial processes, it is desirable to minimize the amount of residual monomer in a latex, for various reasons. From an environmental point of view so as to minimize exposure to hydrocarbon monomers which may be odiferous or may present more serious health concerns; from an economic point of view eliminating the last of 1.0 to 0.5 percent of free monomer is a significantly costly step, and from an efficiency point of view inasmuch as the current methods of reducing the residual monomer in latex tend to be time consuming and slow production down. Furthermore, these processes tend to be energy intensive, thus adding additional costs. More over the novel process allows a manufacturer to avoid having to deal environmental regulations regarding residual monomers.

S. M. Englund, in his paper *Monomer Removal from Latex*, Chemical Engineering Progress (August 1981), p. 55, discusses some of the problems the industry faces. In latex production, the removal of residual hydrocarbon monomer is limited by the rate at which the latex can be contacted with a fresh stream of a fluid, usually steam, to remove the monomer. Thus, the latex may need to be contacted with relatively high amounts of steam to ensure the adequate removal of residual monomer, which can lead to various types of problems such as, for example, foaming, latex destabilization or latex degradation.

The B. F. Goodrich Company has developed a number of methods to remove residual acrylonitrile ("ACN") from aqueous polymeric emulsions. For example, U.S. Pat. No. 4,251,412 discloses a process for the reduction of residual ACN in a latex by adding a stoichiometric amount of amine to react with the CAN; U.S. Pat. No. 4,272,425 discloses a process for reducing the ACN content in latex by adding additional catalyst and co-monomer in excess of the free ACN after 90 percent conversion of the monomers; and U.S. Pat. No. 4,278,582 discloses a process for reducing the residual ACN content of latex by adding ammonia, ammonium hydroxide, thiols, hydrogen sulfide and its salts and alkali and alkaline earth metal carbonates, phosphates and silicates.

Other known methods for reducing residual monomers contemplate fluid injection, usually steam or an inert gas, and/or passing the latex through a reactor at reduced pressure.

Generally in emulsion polymerization, the polymerization conversion rate rapidly increases during an early induction period. However, once the polymerization reaction reaches the point of 94% conversion, the polymerization conversion rate decreases. This phenomenon is especially conspicuous in rubber reinforced latex, where the monomer content drops rapidly once the polymerization conversion rate reaches 94%. This is believed to be caused by the interruption of an initiator (such as, for example, a peroxide) for the permeation of monomers into a rubber particle because of lack of diffusivity. Additionally, a shorter reaction time can likely result in a decrease of the polymerization conversion rate. In the meantime, high rubber content and high solid content makes the migration of monomers into the inside of rubber particles easy, thus also causing a decrease in the polymerization conversion rate.

Methods have also been proposed to reduce residual monomers during polymerization. Thus, German Patent No. 19741188 describes a method that uses a long-chained initiator for the polymerization, WO2000/014123 describes a method to treat alpha-hydroxy carbonyl compound with an antioxidant, U.S. Pat. No. 6,620,883 introduces multiple initiator treatment, and WO2003/010214 describes a method including the additional insertion of a third monomer such as acrylate. Methods to increase drying efficiency after the polymerization process, or to increase the vacuum during extruding and injecting, have also been suggested.

However, there is a limit to the ability of these various methods to eliminate residual monomers. Furthermore, (i) the physical properties of the resin itself could be changed using these methods, such as, for example, their molecular weight—inasmuch as the implementation of these methods generally causes additional polymerization to occur, or (ii) productivity can be decreased by a longer reaction time.

Moreover, none of the prior art refers to techniques for reducing odor caused by residual monomers or initiator fractions or side reactions in non aqueous dispersions (NADs). This is because the introduction of large quantities of water (such as, for example, via steam injection, as described above) destabilizes the NADs.

What is thus needed in the art is a faster and less energy consuming method of reducing the residual monomer content in lattices. What is further needed is such a method that will additionally not change the physical properties of the resin or reaction product, or increase reaction time.

DETAILED DESCRIPTION OF THE INVENTION

In exemplary embodiments of the present invention, a chemical treatment for dramatically reducing the odor of NADs can be implemented. Such a process can create both a safer and a more agreeable work environment, as well as a safer and more pleasant product. Additionally, such a novel treatment can increase the drying time for an NAD as well as remove the need for significant costs associated with the removal of monomers using conventional techniques. In exemplary embodiments of the present invention, such a chemical treatment can include the addition to the NAD of an amine/alkali mixture in a coupling solvent.

In exemplary embodiments of the present invention, this novel process can be applied to any NADs used in various applications and products, such as, for example, paints and coatings.

This novel process is in contrast to, for example, normal methods of odor reduction which involve expensive processing steps such as, for example, vacuum stripping. Thus, the present invention affords a low cost way to minimize residual odors arising from monomers or initiator fragments. As noted, the inventive treatment includes an amine/alkali mixture in a coupling solvent.

Exemplary Two-Stage Novel NAD Process

In exemplary embodiments of the present invention, reduced odor NADs can, for example, be prepared in a two stage process. The following describes an exemplary process performed according to an exemplary embodiment of the present invention. Example sources for the various reagents described are provided in brackets:

In a first stage, for example, a shell polymer can be made in a flask fitted with a stirrer, thermometer, nitrogen inlet, and condenser. To this flask can be added, for example, 170.15 g Magie N-40 oil [Calumet Specialty Products]. The contents of the flask are heated to an elevated temperature, preferably 120° C. To the flask can then be added, for example, a mixture of 196.25 g isobutyl methacrylate [Arkema Inc.], 67.5 g Lauryl methacrylate [Acros Organic], and 5.35 g acrylic acid [Arkema Inc.]; and separately a mixture of 4.15 g Luperox 26M50 [Arkema Inc.], 0.55 g t-butyl peroxy benzoate [Alfa Aesar] and 53.95 g Magie N-40 [Calumet Specialty Products], drop wise over 4 hours.

This mixture can then, for example, be stirred for about 1 hour at an elevated temperature, again preferably about 120° C. To the flask can be added, for example, 2.12 g of Luperox 26M50 [Arkema Inc.]. The mixture can be stirred at an elevated temperature, preferably about 120° C. for about 1 hour. To the flask can be added the novel treatment—for example, 5.0 g of a mixture of 75.0 g water, 9.0 g potassium hydroxide 85% [EMD], 6.0 g isopropyl alcohol, and 10.0 g diethylamine [EMD], and the combined mixture can be stirred for about 1 hour at an elevated temperature, for example, preferably about 120° C. After cooling, such an exemplary shell had a viscosity of 165 pa-sec as measured with a AR1000 rheomoter equipped with a 4 cm/$^2$ degree cone @ 25%, and an acid value (pH) equal to 6.8.

In a second stage, for example, an NAD can be made in a flask fitted with a stirrer, thermometer, nitrogen inlet, and condenser. To this flask can be added 158.65 g Magie N-40 oil [Calumet Specialty Products], and 160.2 g of the shell made in the first stage. The contents of the flask can be heated to an elevated temperature, preferably about 120° C., for example. To the flask is added a mixture of 78.65 g methyl methacrylate [Cyro], 26.6 g n-butyl methacrylate [Arkema], and 31.15 g n-butyl acrylate [Arkema]; and separately a mixture of 2.55 g Luperox 26M50 [Arkema Inc.], 1.25 g t-butyl peroxy benzoate [Alfa Aesar] and 38.85 g Magie N-40 [Calumet Specialty Products], drop wise over 3 hours. The mixture can then, for example, be stirred at an elevated temperature, for example preferably about 120° C. for about 1 hour. To the flask can then be added, for example, 1.40 g of Luperox 26M50 [Arkema Inc.], and 0.70 g t-butylperoxybenzoate [Alfa Aesar]. The mixture can be stirred at an elevated temperature, for example, preferably about 120° C. for about 1 hour. To the flask can then be added the novel treatment—5.0 g of a mixture of, for example, 75 g water, 9.0 g potassium hydroxide 85% [EMD], 6.0 g isopropyl alcohol, and 10.0 g diethyl amine [EMD] and the mixture is stirred for about 1 hour at elevated temperature, preferably at about 120° C., for example. The viscosity of such an exemplary NAD was 7500 cps [Brookfield viscometer—spindle #4, 60 rpm @ 25 C].

It is understood that the types of materials, amounts and processing steps in both the first and second stage of the inventive process, as well as the NAD in the finished ink, paint, coating, etc. can be altered or adjusted, as will be apparent to those skilled in the art, and all such adjusted and/or modified combinations are understood as within the scope of the invention.

In exemplary embodiments of the present invention a treated NAD as described above can be incorporated into a standard sheetfed ink at a 10% level, and this was performed by the inventors in various tests. The ink was printed on a Heidelberg press at a speed of about 15,000 impressions/hr. The prints were dry to the touch (as tested by Prufbau rub tester) within 10 minutes, whereas a standard sheetfed ink without the inclusion of NAD took 2 hours to be sufficiently dry to be processed further. This points out another advantage of the inventive NADs, in that they provide for faster drying when incorporated into an ink, paint or coating. As a result, in NDA processes according to exemplary embodiments of the present invention, less dryers and less drying time can be used, saving energy, time and other resources, and thus conferring an economic benefit as well.

In exemplary embodiments of the present invention treated NAD's, can also be incorporated into other ink and coating types that are compatible with the associated chemistry. Such uses can include, for example, lithographic, flexographic, gravure, screen, and other inks, paints and coatings.

In exemplary embodiments of the present invention the coupling solvent should be soluble in water and mineral oil (so as to be able to bind to hydrophobic as well as hydrophilic components) and can preferably be, for example, an alcohol, glycol or glycol ether. In exemplary embodiments of the present invention the coupling solvent can be, for example, isopropyl alcohol.

In exemplary embodiments of the present invention the amine can be an alkyl amine, such as, for example, diethyl amine. In exemplary embodiments of the present invention other amines that could be used alone or in combination can include, for example, trimethylamine, monoethanolamine, N.N. dimethylethylamine, monoisopropylamine, morpholine, N-methyldiethylamine, 2-amino-2-methyl-1-propanol, N.N. dimethylethanolamine, triethylamine, diethanolamine, N.N. diethylethanolamine, N-methyldiethanolamine, N-ethyldiethyanolamine, N-methyldiethanolamine, N-ethyldiethanolamine, di-isopropanolamine, and triethanolamine.

In exemplary embodiments of the present invention the alkali materials can be, for example, preferably sodium or potassium hydroxide or ammonium hydroxide, either alone or in combination. It is also understood that any other alkali materials could also be used, either alone or in combination.

In exemplary embodiments of the present invention the amount of the treatment consists of 0.1-20% by weight, preferably 0.5-5% by weight of the total NAD.

Based on a blind smell test, an NAD produced in this manner has lower odor than an NAD produced without the addition of the water, potassium hydroxide, isopropyl alcohol, diethyl amine mixture.

In such an exemplary test, participants were given "blind" samples of two versions of an NAD and asked to compare the odor of a standard NAD (produced as described above, but without the addition of the exemplary inventive mixture, as described above, comprising water, potassium hydroxide, isopropyl alcohol, diethyl amine mixture) to the inventive NAD (produced as described above, with the addition of the exemplary mixture of water, potassium hydroxide, isopropyl alcohol, diethyl amine mixture). The participants assigned a rank of from 1 (least odor) to 3 (most odor) for each set of NAD's. The results are recorded in Table 1 below.

TABLE 1

BLIND SMELL TEST

| NAD Sample # | A = Comparative NAD | B = Inventive NAD |
|---|---|---|
| 1 | 2 | 1 |
| 2 | 2 | 1 |
| 3 | 2 | 2 |
| 4 | 2 | 2 |
| 5 | 3 | 2 |
| 6 | 3 | 1 |
| 7 | 3 | 1 |
| 8 | 2 | 2 |
| 9 | 3 | 1 |
| 10 | 3 | 3 |
| 11 | 3 | 3 |
| 12 | 2 | 1 |
| 13 | 3 | 1 |
| 14 | 3 | 1 |
| 15 | 2 | 1 |
| Total | 38 | 23 |
| Average | 2.53 | 1.53 |

In exemplary embodiments of the present invention, an additional benefit conferred is a reduction in un-reacted monomer, which leads to lower airborne contaminants, and thus improved health conditions. Table 2 shows the percentage of various un-reacted monomers in an exemplary NAD both before and after the inventive treatment described herein was added.

TABLE 2

PERCENTAGE OF UN-REACTED MONOMERS IN NAD

| Monomer | NAD Before Treatment | NAD After Treatment |
|---|---|---|
| MMA | 0.11% | 0.05% |
| n-BA | 0 | 0 |
| i-BMA | 0 | 0 |
| n-BMA | 0 | 0 |
| LMA | 0 | 0 |
| Total | 0.11% | 0.05% |

Here un-reacted monomer levels were determined using a Hewlett Packard 5890 Series II gas chromatograph with a 30 meter by 0.25 mm I.D. DB5 column having film thickness of 0.5 microns, and with flame ionization detection. All of the monomers in the first column were originally present in the NAD, and, as seen, only MMA had significant un-reacted monomer after the polymerization reaction had run. Treatment of the NAD using the novel additive resulted in a decrease of such un-reacted MMA monomer by more than half.

Although the present invention has been described in relation to particular embodiments thereof, many other variations and modifications and other uses will become apparent to those skilled in the art. Therefore, the present invention is to be limited not by the specific disclosure herein, but only by the appended claims.

We claim:

1. A method of reducing the odor of a non-aqueous dispersion of acrylic polymers, comprising: adding an amine-alkali mixture in a coupling solvent to the non-aqueous dispersion, wherein said non-aqueous dispersion is prepared in an ink oil; and wherein the coupling solvent is soluble in water and mineral oil;
   wherein the reduced odor is an odor caused by residual monomers and/or initiator fragments.

2. The method of claim 1, wherein the coupling solvent is one or more of an alcohol, glycol or glycol ether.

3. The method of claim 1, wherein the coupling solvent is isopropyl alcohol.

4. The method of claim 1, wherein the amine is an alkyl amine.

5. The method of claim 4, wherein the alkyl amine is diethyl amine.

6. The method of claim 1, wherein the alkali is one or more of sodium hydroxide, potassium hydroxide and ammonium hydroxide.

7. The method of claim 1, wherein the alkyl amine is one or more of trimethylamine, monoethanolamine, N,N-dimethylethylamine, monoisopropylamine, morpholine, N-methyldiethylamine, 2-amino-2-methyl-1-propanol, N,N-dimethylethanolamine, triethylamine, diethanolamine, N,N-diethylethanolamine, N-methyldiethanolamine, N-ethyldiethyanolamine, N-methyldiethanolamine, N-ethyldiethanolamine, di-isopropanolamine, and triethanolamine.

8. The method of claim 1, wherein the amine-alkali mixture comprises water, potassium hydroxide, isopropyl alcohol, and diethyl amine.

9. The method of claim 8, wherein the mixture is prepared from a mixture having the proportions of 75.g water, 9.0 g potassium hydroxide 85%, 6.0 g isopropyl alcohol, and 10.0 g diethyl amine.

10. The method of claim 1, wherein the added quantity of amine-alkali mixture is from of 0.1-20% by weight of the total non-aqueous dispersion.

11. The method of claim 10, wherein the added quantity of amine-alkali mixture is from 0.5 to 5% by weight of the total non-aqueous dispersion.

12. A method of optimizing the production of acrylic polymers, comprising:
   preparing a non-aqueous dispersion in which a polymerization reaction is run, wherein said non-aqueous dispersion is prepared in an ink oil; and
   adding a chemical additive to bind to any residual monomer and/or initiator fractions;
   wherein the chemical additive comprises an amine-alkali mixture in a coupling solvent, wherein the coupling solvent is soluble in water and mineral oil.

13. The method of claim 12, wherein the coupling solvent is one or more of an alcohol, glycol or glycol ether.

14. The method of claim 12, wherein the amine is an alkyl amine.

15. The method of claim 12, wherein the alkali is one or more of sodium hydroxide, potassium hydroxide and ammonium hydroxide.

16. The method of claim 12, wherein the amine-alkali mixture decreases the drying time of the polymer.

17. The method of claim 1 wherein the amine-alkali mixture decreases the drying time of the polymer.

* * * * *